Patented Oct. 28, 1924.

1,513,153

UNITED STATES PATENT OFFICE.

JEAN HENRY BRÉGEAT, OF PARIS, FRANCE.

RECOVERY OF VOLATILE SOLVENTS AND OTHER MATERIALS FROM GAS MIXTURES.

No Drawing.   Application filed June 26, 1923.   Serial No. 647,921.

*To all whom it may concern:*

Be it known that I, JEAN HENRY BRÉGEAT, citizen of the Republic of France, residing at Paris, Department of the Seine, France, have invented certain new and useful Improvements in the Recovery of Volatile Solvents and Other Materials from Gas Mixtures, of which the following is a specification.

The present invention relates to the recovery of volatile solvents and other volatile materials which occur in the vapor form in mixtures composed largely of air or other gases.

In prior patents issued to me I have described and claimed the use of cresols and similar liquids for absorbing the vapors of volatile solvents. Other processes have been proposed in which volatile solvents or other volatile organic substances are absorbed from gases carrying the vapors of such substances, by bringing the gas mixture into intimate and methodical content (i. e., by counter current contact) with various liquids such as tar oils, paraffin oils, cresols, tars, anthracene oil and the like.

It has been observed, in the industrial application of such processes, that the addition of naphthalene to the absorbent liquid, materially increases its power of absorption of the vapors of the volatile sustances.

For instance, the addition of 10% of naphthalene to pure tricresol (a mixture of ortho, meta and para cresol, produced from tar distillates and distilling between about 190 and 210° C.,) has produced an increase of about 15% in its absorbing power for ether vapor when the latter is mixed with air. This same addition increases the absorbing power for benzene vapors mixed with an illuminating gas. The addition of naphthalene has the further advantage of decreasing the viscosity of tricresol by about 25% without materially changing its specific gravity. It is however, somewhat objectionable to add naphthalene to absorbing liquids for use in the absorption process, because more or less naphthalene may be carried over by the water vapor in the distillation of the volatile solvents from the used absorbing liquid, whereby such naphthalene might in part become lost and might also cause trouble by clogging up the pipes of the apparatus.

The present invention depends upon the discovery which I have made, that by employing hydrogenated derivatives of naphthalene, in place of naphthalene, either as an addition to various absorbent liquids of the class above referred to, or alone, a very high absorbing power of the scrubbing liquid is developed, without being open to the objections of ordinary naphthalene.

Various hydrogenated products of naphthalene may be employed such as tetrahydro-naphthalene and deca-hydro-naphthalene (known commercially as "tetralin" and "decalin" respectively), as well as mixtures of such materials can be used. These can be used either alone or mixed in variable proportions with tar oils, paraffin oils, cresols, and other oily liquids, and can be used for absorbing various vaporized substances. As a particular example, coke oven gas is treated (for example, by the methods shown in Patents Nos. 1,315,700, and 1,455,707 with a mixture of 60% of tricresol (190 to 210° C., boiling point range) and 40% of tetra-hydro-naphthalene. These gave a better yield (by about 8%) of the light products (benzene, toluene, etc.,) than did the use of the anthracene oil ordinarily used for this purpose, the other conditions of operation being the same.

The naphthalene hydrides are soluble in all proportions, in paraffin oils, tar oils, carbolic acid, cresols (singly or mixed) and other like liquids. The absorbed volatile substances can be separated from the absorbing liquid after use, by fractional distillation, for example, as shown in my prior patents above referred to, and the absorbing agents are thereby regenerated for reuse in the process, whereby the recovery of the volatile materials in the continuous operation is made possible. The following examples can be mentioned:

No. 1. *Recovery of sulfuric ether with mixture.*
    90% tricresol (190°–210° C.).
    10% tetraline or decaline.
    Absorption increased by about 5%.

No. 2. *Recovery of ethyl alcohol with mixture.*
    80% tricresol (190°–210° C.).
    20% tetraline or decaline.
    Absorption increased by about 12%.

No. 3. *Recovery of light oil and benzene from the incondensable gases from the carbonization of lignite with mixture.*
    50% tricresol (190°–210° C.).
    20% tetraline or decaline.
    30% paraffin oil (300°–370° C.).
    Absorption increased by about 25% over the use of paraffin oil alone; by about 10% over the use of tricresol alone.

No. 4. *Recovery of gasoline from natural gas at Boryslaw with mixture.*
    50% tricresol (190°–210° C.).
    50% tetraline or decaline.
    Absorption increased by about 20% over the use of paraffin oil alone (300°–370° C.).

No. 5. *Recovery of a mixture containing 2/3 light oil, 1/3 benzene, lost at the Scheidemandel plant at Rannersdorf near Vienna in their plant for the extraction of fats from bones.*
    40% heavy oil of coal tar (250°–350° C.).
    60% tetraline or decaline.
    Absorption increased by 25% over the use of the heavy oil of coal tar.

The main substances which can be absorbed by the process are as follows: benzine (ligroine, gasoline, petroleum ether); benzol (benzene, toluene, xylenes); sulfuric ether, acetic ether, and other ethers; chloroform, acetone; methyl, ethyl, amyl, etc., alcohols; carbon sulfide and tetrachloride. Chlorine derivatives of ethane and ethylene (used in the extraction of fats by means of solvent), etc. (the above products being only mentioned as examples and not liable to limit the scope of the invention).

I claim:

An improvement in the absorption of the vapors of an organic substance from a gas mixture containing the same, which comprises bringing the gas mixture to be denuded of such organic substance, into contact with an absorbent menstrum containing hydrogenated naphthalene, and thereafter separating the absorbed volatile substance.

In testimony whereof I affix my signature.

JEAN HENRY BRÉGEAT.